US008713566B2

(12) United States Patent
Kashyap et al.

(10) Patent No.: US 8,713,566 B2
(45) Date of Patent: Apr. 29, 2014

(54) METHOD AND SYSTEM FOR DELIVERING AND EXECUTING VIRTUAL CONTAINER ON LOGICAL PARTITION OF TARGET COMPUTING DEVICE

(75) Inventors: Vivek Kashyap, Beaverton, OR (US); David L. Keskovec, Beaverton, OR (US); S. Scott Moser, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 13/017,420

(22) Filed: Jan. 31, 2011

(65) Prior Publication Data
US 2012/0198442 A1 Aug. 2, 2012

(51) Int. Cl.
*G06F 9/455* (2006.01)
*G06F 9/46* (2006.01)

(52) U.S. Cl.
USPC ............................................. 718/1; 718/104

(58) Field of Classification Search
None
See application file for complete search history.

(56) References Cited

U.S. PATENT DOCUMENTS 7,673,113 B2 * 3/2010 Sugumar et al. ............. 711/170
7,971,047 B1 * 6/2011 Vlaovic et al. ................. 713/1
8,321,554 B2 * 11/2012 Dickinson .................... 709/224
2006/0217952 A1 * 9/2006 Wu et al. ........................ 703/24
2010/0306772 A1 * 12/2010 Arnold et al. .................... 718/1

OTHER PUBLICATIONS

"Virtualized hypervisor-neutral . . . ," Rational Survivability Blog, rationalsecurity.typepad.com/blog/2008/07/pondering-virtu.html, Jul. 19, 2008.
"The Open Virtual Machine Format Whitepaper for OVF Specification," version 0.9, vmware.com, copyright 2007.

* cited by examiner

*Primary Examiner* — Camquy Truong
(74) *Attorney, Agent, or Firm* — Steven L. Bennett

(57) ABSTRACT

A virtual container includes an application computer program and metadata representing the operating system requirements. The virtual container is stored on a computer-readable storage medium for delivery to an end user for copying to a target computing device. The virtual container is equivalent to a virtual appliance minus an operating system. The virtual container is executable on an existing logical partition (LPAR) of the target computing device that provides a virtual operating system for the application of the virtual container, where the virtual container is specifically executable within a workload partition (WPAR) of the LPAR. The virtual container is also executable on a new LPAR of the target computing device, where the end user provides a guest operating system to run within the new partition for the virtual container, such that addition of the guest operating system to the virtual container renders the virtual container as a virtual appliance.

18 Claims, 4 Drawing Sheets

METHOD AND SYSTEM FOR DELIVERING AND EXECUTING VIRTUAL CONTAINER ON LOGICAL PARTITION OF TARGET COMPUTING DEVICE

FIELD OF THE INVENTION

The present invention relates generally to software appliances like virtual appliances, and more particularly to virtual containers, which are equivalent to virtual appliances minus operating systems of the virtual appliances.

BACKGROUND

A software appliance is a software application that is combined with an operating system for the software application to run optimally directly on hardware or within a virtual machine virtualizing the hardware. A virtual appliance is a type of software appliance. A virtual appliance is a software application that is combined with an operating system for the software application to specifically run within a virtual machine virtualizing hardware, particularly within a logical partition (LPAR). Software appliances and virtual appliances eliminate the installation, configuration, and maintenance costs associated with running complex stacks of software, because they provide an image of all the software needed to run a given software application. As such, the software application does not have to be installed on the target hardware or the target virtual machine, but rather just has to be extracted and copied to the target hardware or the target virtual machine.

BRIEF SUMMARY

A method of an embodiment of the invention permits a user, by a computing device, to select an application computer program to include in a virtual container. The method permits the user, by the computing device, to select operating system requirements for the application computer program. The method generates the virtual container, by the computing device. The virtual container includes the application computer program and metadata representing the operating system requirements. The method stores the virtual container, by the computing device, on a computer-readable storage medium for delivery of the virtual container to an end user for copying to a target computing device of the end user. The virtual container is equivalent to a virtual appliance minus an operating system.

A method of another embodiment of the invention receives, by a computing device, a virtual container equivalent to a virtual appliance minus an operating system. The method extracts, by the computing device, an application computer program and metadata from the virtual container. The metadata represents operating system requirements for the application computer program. The method permits a user, by the computing device, to select a partition of a target computing device that provides a virtual operating system for the application of the virtual container. Where the virtual operating system of the partition of the target computing device satisfies the operating system requirements for the application computer program, the method copies, by the computing device, the application computer program within the partition of the target computing device. As such, the application computer program runs on the virtual operating system of the partition.

In another embodiment, the method permits the user, by the computing device, to select a different partition of the target computing device. This partition has a guest operating system. Where the guest operating system of this partition of the target computing device satisfies the operating system requirements for the application computer program, the method copies, by the computing device, the application computer program within this partition of the target computing device. As such, the application computer program runs on the guest operating system of this partition. Addition of the operating system to the virtual container renders the virtual container as the virtual appliance.

A system of an embodiment of the invention includes a computer-readable data storage medium, hardware, one or more logical partitions, one or more workload partitions, and logic. The computer-readable data storage medium stores a virtual container including an application computer program and metadata representing operating system requirements for the application computer program. The virtual container is equivalent to a virtual appliance minus an operating system. The hardware includes one or more processors, memory, and one or more storage devices. The logical partitions are implemented by the hardware, and each logical partition has a guest operating system running thereon. The workload partitions are implemented by the logical partitions, and each workload partition has a virtual operating system running thereon.

The logic is implemented by the hardware to copy the application computer program to a given partition selected from the logical partitions and the workload partitions. The guest operating system or the virtual operating system of the given partition satisfies the operating system requirements for the application computer program. Where the given partition is one of the logical partitions, the application computer program runs on the guest operating system of the given partition, such that addition of the guest operating system to the virtual container renders the virtual container as the virtual appliance. Where the given partition is one of the virtual partitions, the application computer program runs on the virtual operating system of the given partition.

A computer program product of an embodiment of the invention includes a computer-readable data storage medium storing one or more computer programs that when executed by a computing device cause a method to be performed. The method permits a user to select an application computer program to include in a virtual container. The method permits the user to select operating system requirements for the application computer program. The method generates the virtual container. The virtual container includes the application computer program and metadata representing the operating system requirements. The method stores the virtual container on a computer-readable storage medium for delivery of the virtual container to an end user for copying to a target computing device of the end user. The virtual container is equivalent to a virtual appliance minus an operating system.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

Figure 1A:
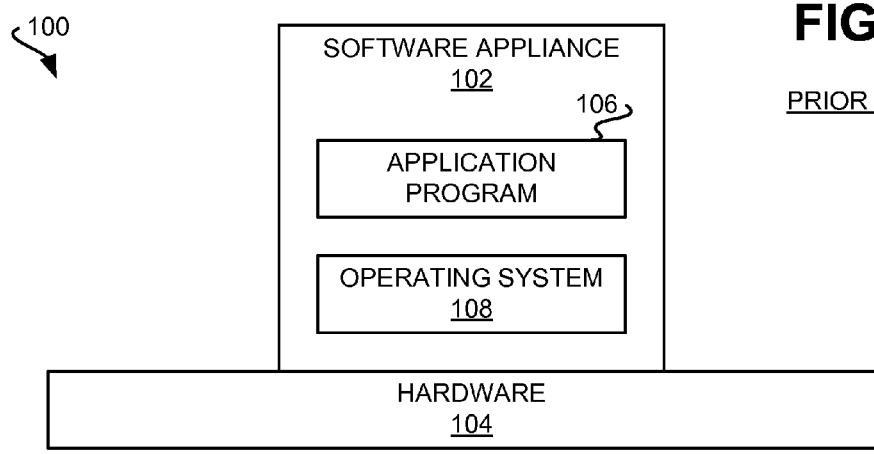
FIGS. 1A and 1B are diagrams depicting conventional deployment of a software appliance of virtual appliances, respectively.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

Software appliances like virtual appliances include both an application computer program and an operating system on which the application computer program is to be run. A software appliance like a virtual appliance is thus an image of an application computer program and an operating system. The application computer program and the operating system are extracted from the image. In the case of a software appliance, the application computer program and the operating system are copied to hardware, such as a computing device like a server. The operating system runs directly on the hardware, and the application computer program runs on the operating system.

In the case of a virtual appliance, the application computer program and the operating system are copied to a logical partition (LPAR) of a computing device like a server. The operating system of the virtual appliance is thus a guest operating system that runs within a virtual machine provided by the LPAR, and the application computer program runs on this guest operating system. A given computing device can support multiple LPARs, each corresponding to a separate virtual machine. Therefore, to run a virtual appliance, a new LPAR is created for the virtual appliance.

Software appliances like virtual appliances can be problematic, because they require the inclusion of operating systems in addition to application computer programs. A developer or provider may want for a given application computer program to be able to be run on a number of different operating systems, and/or on a number of different versions of an operating system. As such, there are two primary problems. First, the developer or provider has to maintain a separate appliance for each different operating system, and for each version of the same operating system, which can become unwieldy. Second, the developer or provider has to have the proper license for each version of each operating system to distribute the appliance to end users, even if the end users already have licenses to run the versions of the operating systems in question.

Embodiments of the present invention overcome these problems, by providing a virtual container. A virtual container is equivalent to a virtual appliance, minus the operating system. That is, a virtual container is an image of an application computer program, and also includes metadata representing operating system requirements for the application computer program. In addition to being able to being run on its own LPAR of a computing device as a virtual appliance, a virtual container can run on a virtual operating system within a workload partition (WPAR) of an LPAR, where an LPAR may support multiple WPARs.

A developer or provider does not have to maintain a separate virtual container for each different operating system, and for each version of the same operating system. Rather, the developer or provider just has to maintain a single virtual container, where the metadata represents operating system requirements for the application computer program as to each different operating system and as to each version of the same operating system. Furthermore, the developer or provider does not have to have a distribution license for each version of each operating system to distribute a virtual container, because the virtual container does not actually include the operating system.

A virtual container differs from a standard installation or setup executable file. A standard installation or setup executable file, such as an .msi file, is run on a computing device or on a virtual machine to install a given application computer program on the device or machine in question. That is, execution of this executable file actually installs the application computer program, by performing a formal installation procedure.

By comparison, a virtual container is an image of an application computer program that may already have been preinstalled. That is, the application computer program within a virtual container is a virtualized application, which may have been already installed on a given LPAR and WPAR and then subsequently encapsulated to divorce the application from the underlying operating system. The application computer program is extracted from the image, and is simply copied to the desired LPAR or WPAR environment. Although the application computer program may have to be configured for the specific guest operating system of an LPAR or the specific virtual operating system of a WPAR, a formal installation procedure of the application computer program does not occur, which is typically a more time-consuming process than straightforward copying.

Embodiments of the invention permit the virtual appliance to be instantiated as a full virtual machine, such as a kernel-based virtual machine (KVM) guest (i.e., a KVM virtual machine), an LPAR, a WPAR (i.e., a LINUX container), and so on. That is, using a VM defined against a (virtual) container (i.e., an abstract hypervisor) permits of a virtual machine or an application on an existing operating system of a system, as well as creating a new virtual machine on a target hypervisor. As such, the operating system image and the tie-in of this image to a specific hypervisor are removed. As such, virtual appliances can be deployed on the operating system that a user already has installed on his or her system.

FIG. 1A shows a computing device 100 on which a conventional software appliance 102 is running. The computing device 100 includes hardware 104, such as one or more processors, memory, one or more storage devices, and other types of hardware. The software appliance 102 includes an application computer program 106 and an operating system 108. The operating system 108 is directly executed on the hardware 104 of the computing device 100, and the application program 106 runs on the operating system 108.

Figure 1B:
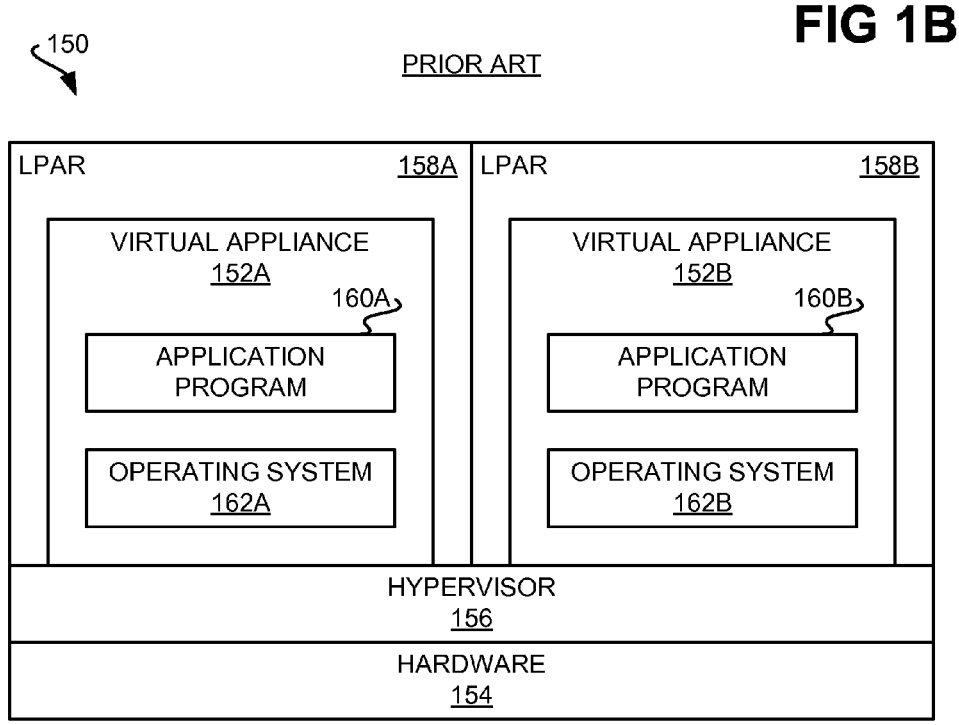

FIG. 1B shows a computing device 150 on which conventional virtual appliances 152A and 152B, collectively referred to as the virtual appliances 152, are running. The computing device 150 includes hardware 154, such as one or more processors, memory, one or more storage devices, and other types of hardware. Running on the hardware 154 is a hypervisor 156, which may also be referred to as a virtual machine monitor (VMM).

The hypervisor 156 manages the creation, maintenance, and removal of LPARs 158A and 158B, collectively referred to as the LPARs 158. Each LPAR 158 corresponds to a virtual machine. As such, the hypervisor 156 manages the creation, maintenance, and removal of these virtual machines.

The virtual appliances 152A and 152B include application computer programs 160A and 106B, respectively, which are collectively referred to as the application computer programs 160, as well as operating systems 162A and 162B, respectively, which are collectively referred to as the operating systems 162. Each operating system 162 runs within a corresponding LPAR 158, and can be referred to as a guest operating system. As such, each operating system 162 does not run directly on the hardware 154, but rather runs within the virtual machine of its corresponding LPAR 158. The application programs 160 are then run on their corresponding operating systems 162.

Figure 2A:
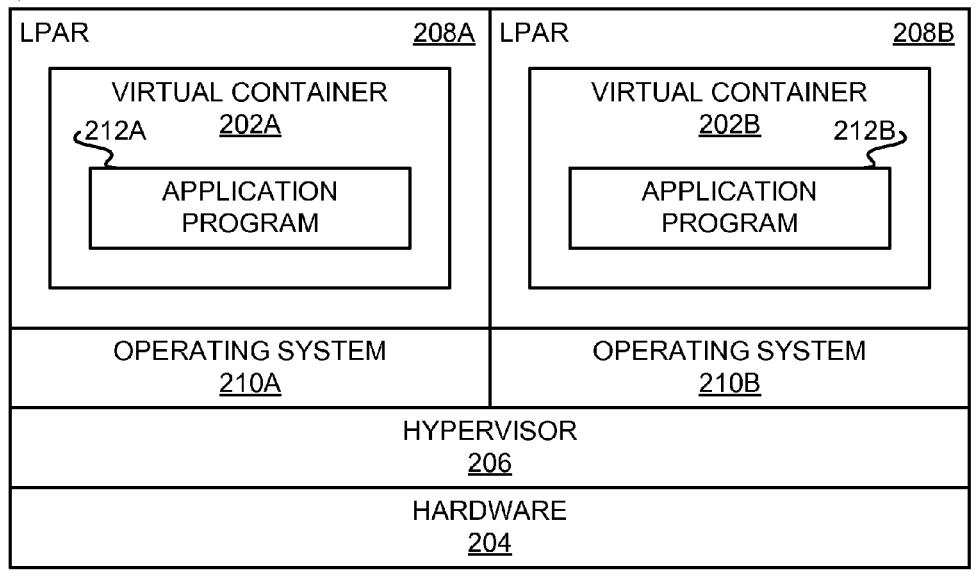
FIGS. 2A and 2B are diagrams depicting deployment of a virtual container within a workload partition (WPAR) and within a logical partition (LPAR), respectively, according to different embodiments of the present invention.

FIG. 2A shows a computing device 200 on which virtual containers 202A and 202B, collectively referred to as the virtual containers 202, are running, according to an embodiment of the invention. The computing device 200 includes hardware 204, such as one or more processors, memory, one or more storage devices, and other types of hardware. Running on the hardware 204 is a hypervisor 206, which may also be referred to as a VMM.

The hypervisor 206 manages the creation, maintenance, and removal of LPARs 208A and 208B, collectively referred to as the LPARs 208. Each LPAR 208 corresponds to a virtual machine. As such, the hypervisor 206 manages the creation, maintenance, and removal of these virtual machines. The LPARs 208 have corresponding operating systems 210A and 210B running on them, and which are collectively referred to as the operating systems 210.

Each operating system 210 runs within a corresponding LPAR 208, and can be referred to as a guest operating system. As such, each operating system 210 does not run directly on the hardware 204. Rather, the operating systems 210 run within the virtual machines of their corresponding LPARs 208.

The virtual containers 202A and 202B include application computer programs 212A and 212B, respectively, which are collectively referred to as the application computer programs 212. The application computer programs 212 run on the operating systems 210 of their corresponding LPARs 208. However, the virtual containers 202 do not include the operating systems 210 themselves. A virtual container 202, including its corresponding application program 212, is considered equivalent to a virtual appliance, minus the operating system that is part of the virtual appliance.

When a user receives a virtual container that he or she wishes to run on the computing device 200, the user may thus create a new LPAR on the computing device 200, and provide a guest operating system to run on this new LPAR. The virtual container—i.e., its constituent application computer program—is then run on the guest operating system of this new LPAR. In general, each virtual container includes just one application computer program.

Figure 2B:
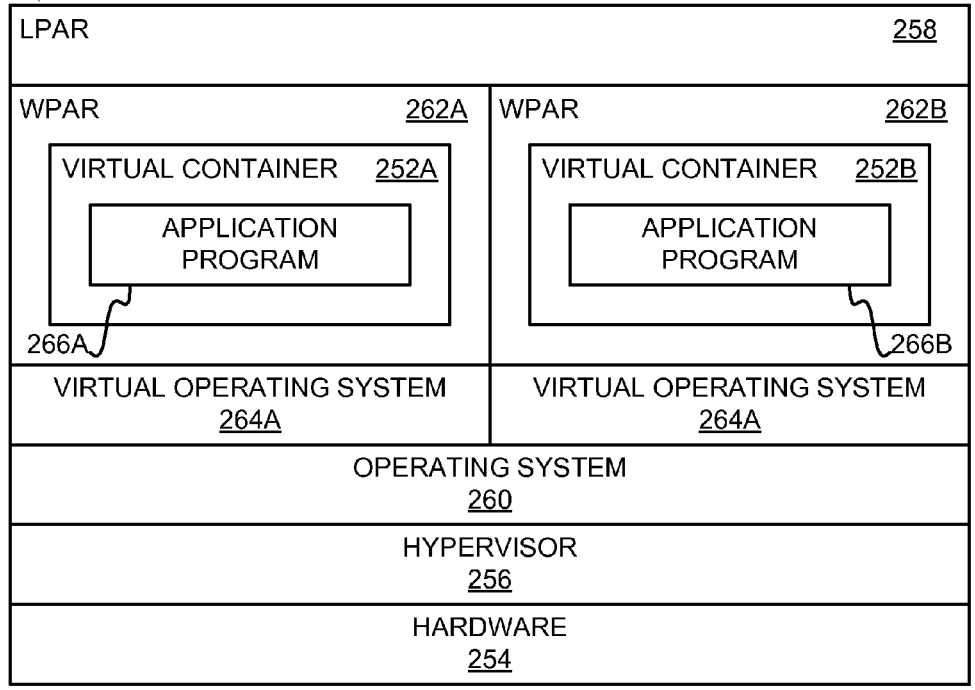

FIG. 2B shows a computing device 250 on which virtual containers 252A and 252B, collectively referred to as the virtual containers 252, are running, according to another embodiment of the invention. The computing device 250 includes hardware 254, such as one or more processors, memory, one or more storage devices, and other types of hardware. Running on the hardware 254 is a hypervisor 256, which may also be referred to as a VMM.

The hypervisor 256 manages the creation, maintenance, and removal of LPARs, such as the LPAR 258. Each LPAR corresponds to a virtual machine. As such, the hypervisor 256 manages the creation, maintenance, and removal of these virtual machines. The LPARs have corresponding operating systems running on them. For instance, the LPAR 258 has an operating system 260 running on it. The operating system 260 can be referred to as a guest operating system. The operating system 260 does not run directly on the hardware 254, but rather runs within the virtual machine of its corresponding LPAR 258.

The hypervisor 256 also manages the creation, maintenance, and removal of WPARs 262A and 262B, collectively referred to as the WPARs 262. Each WPAR 262 is an isolated environment within its respective virtual machine of the LPAR 258. The hypervisor 256 manages the creation, maintenance, and removal of the environments, or WPARs 262.

The WPARs 262A and 262B have virtual operating systems 264A and 264B, respectively, running on them, and which are collectively referred to as the virtual operating systems 264. The virtual operating systems 264 are more abstracted than the guest operating system 260 of the LPAR 258 is. Specifically, the virtual operating systems 264 run within their corresponding isolated environments of the WPARs 262, as provided by the guest operating system 260, which itself runs within the virtual machine of its corresponding LPAR 258.

It is noted that the environments of the WPARs 262 themselves may be considered as virtual operating systems. It is further noted that support for each WPAR 262 is built into the guest operating system 260, in which system resources supported by the guest operating system 260 are virtualized and isolated for that particular WPAR 262. An application computer program instantiated within a given WPAR 262, therefore, runs as if it were running within an independent and completed operating system or virtual machine.

While the virtual machine is generally completely isolated from other virtual machines, the semi-isolated environments of the WPARs 262 are not completely isolated from one another. As such, however, the semi-isolated environments of the WPARs 262 do not require as much overhead to run as the virtual machine of the LPAR 258 does. Stated another way, the WPARs 262 are hierarchically lower than the LPAR 258, in that the WPARs 262 exist within the LPAR 258.

The virtual operating systems 264 are virtual in a way that the operating system 260 is not. Specifically, the virtual operating systems 264 are virtual in that they run within another operating system, as opposed to directly on hardware, or within a virtual machine. By comparison, the operating system 260 runs within the virtual machine of the LPAR 258.

The virtual containers 252A and 252B include application computer programs 266A and 266B, respectively, which are collectively referred to as the application computer programs 266. The application computer programs 266 run on the virtual operating systems 264 of their corresponding WPARs 262. However, the virtual containers 252 do not include the virtual operating systems 264 themselves. A virtual container 252, including its corresponding application program 266, is considered equivalent to a virtual appliance, minus the operating system that is part of the virtual appliance.

In general, a single virtual container is run in each partition. For example, in FIG. 2A, a single virtual container 202 is run within each LPAR 208. Similarly, in FIG. 2B, a single virtual container 252 is run within each WPAR 262. In this sense, a virtual container corresponds to a virtual appliance minus the operating system that is part of the virtual appliance. This is because typically a single virtual appliance is run in each partition, although virtual appliances can only be run within LPARs, and not within WPARs, whereas virtual containers can run within WPARs in addition to being run within LPARs.

A virtual container thus permits a developer or provider to package an application computer program for running on an operating system, without having to provide the operating system itself. The end user that is to deploy the virtual container may first ensure that a compatible operating system is running on a selected partition of a desired computing device. The end user then deploys the virtual container on the selected partition, such that the application computer program runs on the operating system—be it a guest operating system or a virtual operating system—of this partition.

Figure 3:
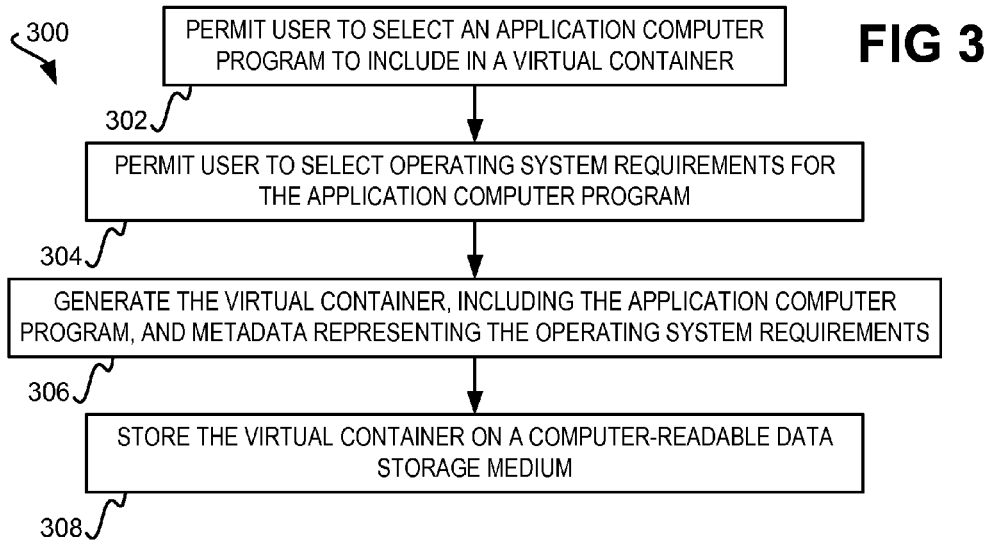
FIG. 3 is a flowchart of a method for creating a virtual container, according to an embodiment of the present invention.

FIG. 3 shows a method 300 for creating a virtual container, according to an embodiment of the invention. The method 300, like other methods of embodiments of the invention, may be performed by a computing device. For example, the method 300 may be implemented as a computer program having a computer-readable data storage medium that stores one or more computer programs, where execution of these computer programs by the computing device causes the method 300 to be performed.

A user, such as a developer or provider, is permitted to select an application computer program to include within a virtual container (302). Examples of such application computer programs include typical server-side computer programs, like web hosting computer programs, database computer programs, and so on. Examples of such application computer programs include typical client-side computer programs as well, like word processing computer programs, spreadsheet computer programs, and so on. In general, the only type of computer program that the application computer program cannot be is an operating system and its associated files, since a virtual container does not include an operating system.

The user is further permitted to select the operating system requirements for the application computer program (304). The operating system requirements specify the identities of one or more operating systems, and/or one or more versions of each such operating system, on which the application computer program can run. Examples of such operating systems include the LINUX® operating system, where LINUX® is a trademark of Linus Torvalds; the UNIX® operating system, which is a trademark of The Open Group, of Cambridge, Mass.; and, the AIX® operating system, where AIX® is a trademark of International Business Machines Corp., of Armonk, N.Y., among other types of operating systems.

The virtual container is then generated (306). The virtual container includes the application computer program, and metadata representing the operating system requirements. For example, the metadata can include configuration information for configuring each version of each operating system specified in part 304, so that the application computer program can properly run on such versions of such operating systems. The virtual container may be generated in a modified open virtualization format (OVF), which is typically used to generate and store virtual appliances.

In one embodiment, the virtual container may be generated as follows. The application computer program is installed on a computing device, and dependencies between the application computer program and the computing device's operating system noted. The application computer program is then encapsulated to divorce the program from the underlying operating system. In particular, all the files of the application computer program are copied, and the dependencies of the application computer program to the underlying operating system are recorded as part of the configuration information that is needed to configure the program on this operating system.

Portions of this process may be repeated for each different operating system on which the application computer program is to be run, and/or for each different version of each different operating system on which the program is to be run. For example, the files of the application computer program may be identical regardless of which version of which operating system the program is run. However, the dependencies between the application computer program and each version of each operating system and/or each operating system may be different. Therefore, for each version of each operating system and/or for each operating system in question, configuration information is generated that reflects the operating system dependencies of the application computer program, so that they can be recreated when the application computer program is to be run within a selected partition of a target computing device.

In this respect, the application computer program as stored within the virtual container may be considered as being pre-installed. All the files needed to run the application computer program are initially installed on a computing device, and then copied from this computing device into the virtual container. Therefore, when the application computer program is deployed on a target computing device, the program does not have to be reinstalled using a formal installation procedure. Rather, the files of the application computer program simply have to be copied from the virtual container to the selected partition on the target computing device.

Ultimately, then, the virtual container as has been generated is stored on a computer-readable data storage medium (308), for delivery to an end user for copying to a target computing device of the end user. The virtual container may be a stored as a single file, such as a single image file, on the computer-readable storage medium. As one example, the virtual container may be stored as a single file in .tar format, among other types of image file formats.

Figure 4:
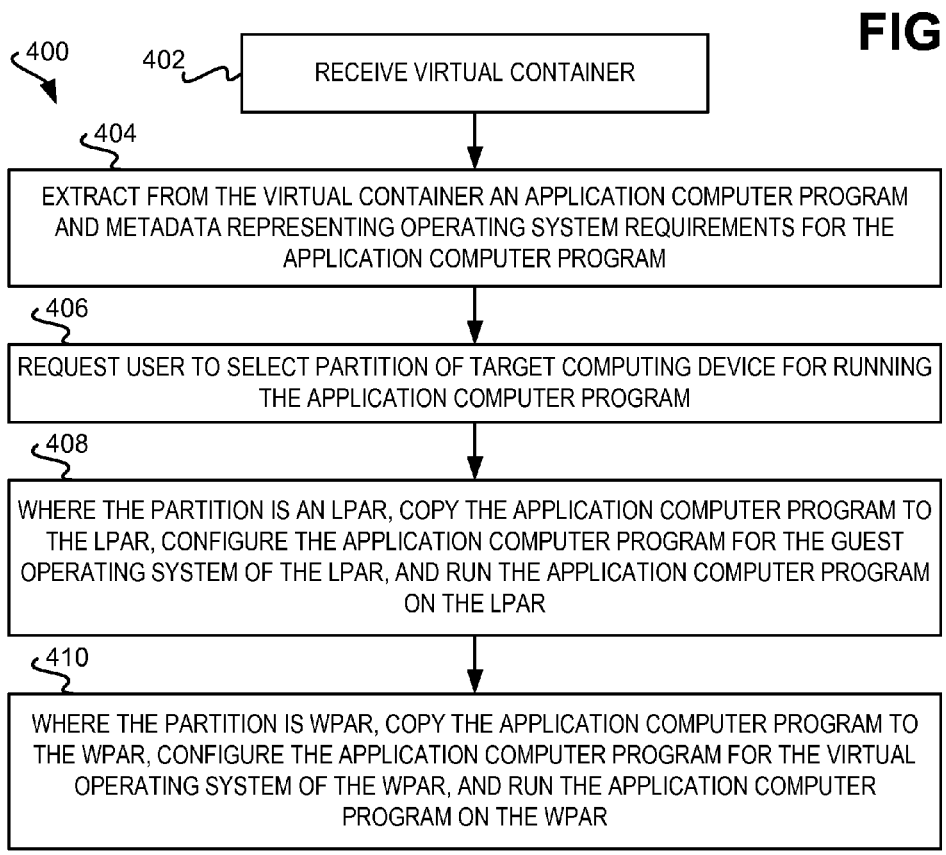
FIG. 4 is a flowchart of a method for deploying a virtual container, according to an embodiment of the present invention.

FIG. 4 shows a method 400 for deploying a previously created virtual container, according to an embodiment of the invention. A virtual container is received (402). An application computer program is extracted from the virtual container, as is metadata representing the operating system requirements for the application computer program (404). Configuration information for running the application computer program on various operating system versions and/or on various operating systems may also be extracted from the virtual container. A user is then requested to select a partition (i.e., LPAR), container, or WPAR of a target computing device on which to run the application computer program (406).

For example, the partition may be an LPAR on which no other computer programs besides a guest operating system is currently running. It is thus said that the user provides the guest operating system within the LPAR to run the application computer program, such that the addition of the guest operating system renders the virtual container equivalent to a virtual appliance. As another example, an application computer program may be instantiated as a WPAR, where the application computer program runs directly on a target virtual operating system. It is thus said that the user provides the virtual operating system within the WPAR to run the application computer program, such that the addition of the virtual operating system renders the virtual container equivalent to a virtual appliance.

Where the partition is an LPAR, and where the guest operating system of the LPAR satisfies the operating system requirements for the application computer program as represented by the metadata, the following is performed (408). Specifically, the application computer program is copied to the LPAR; that is, the files of the application computer program are copied from the virtual container to the LPAR. The application computer program is then configured for the guest operating system of the LPAR, based on the configuration information for this operating system as also stored within the virtual container. The application computer program is finally run.

Where the partition is a WPAR, and where the virtual operating system of the WPAR satisfies the operating system requirements for the application computer program as represented by the metadata, the following is performed (410). Specifically, the application compute program is copied to the WPAR; that is, the files of the application computer program are copied from the virtual container to the WPAR. The application computer program is then configured for the virtual operating system of the WPAR, based on the configuration information for this operating system as also stored within the virtual container. The application computer program is finally run.

The virtual or guest operating system of the selected partition is said to satisfy the operating system requirements for the application computer program in parts 408 and 410 when it matches the metadata of the virtual container. The metadata specifies on which versions of which operating systems and/or on which operating systems the application computer program can be run. Therefore, if the virtual or guest operating system of the selected partition is one of these operating system versions and/or is one of these operating systems, then it is said that the operating system satisfies the operating system requirements for the application computer program.

Furthermore, configuration of the application computer program for the operating system of the selected partition is performed by recreating the dependencies between the application computer program and this operating system. Such dependencies resulted when the application computer program was previously installed on a different instance of this operating system, prior to the application computer program being encapsulated during the virtual container generation process. Because these dependencies were noted and stored within the virtual container, they can be recreated at the selected partition itself.

It is noted that the performance of such a configuration process is not considered as part of a formal installation procedure of the application computer program, but rather is a post-installation process. That is, the application computer program is not being installed per se on the selected partition, because the application computer program is in a preinstalled form as stored within the virtual container. Rather, the files of the application computer program, resulting from prior installation thereof, are copied from the virtual container to the selected partition.

Figure 5:
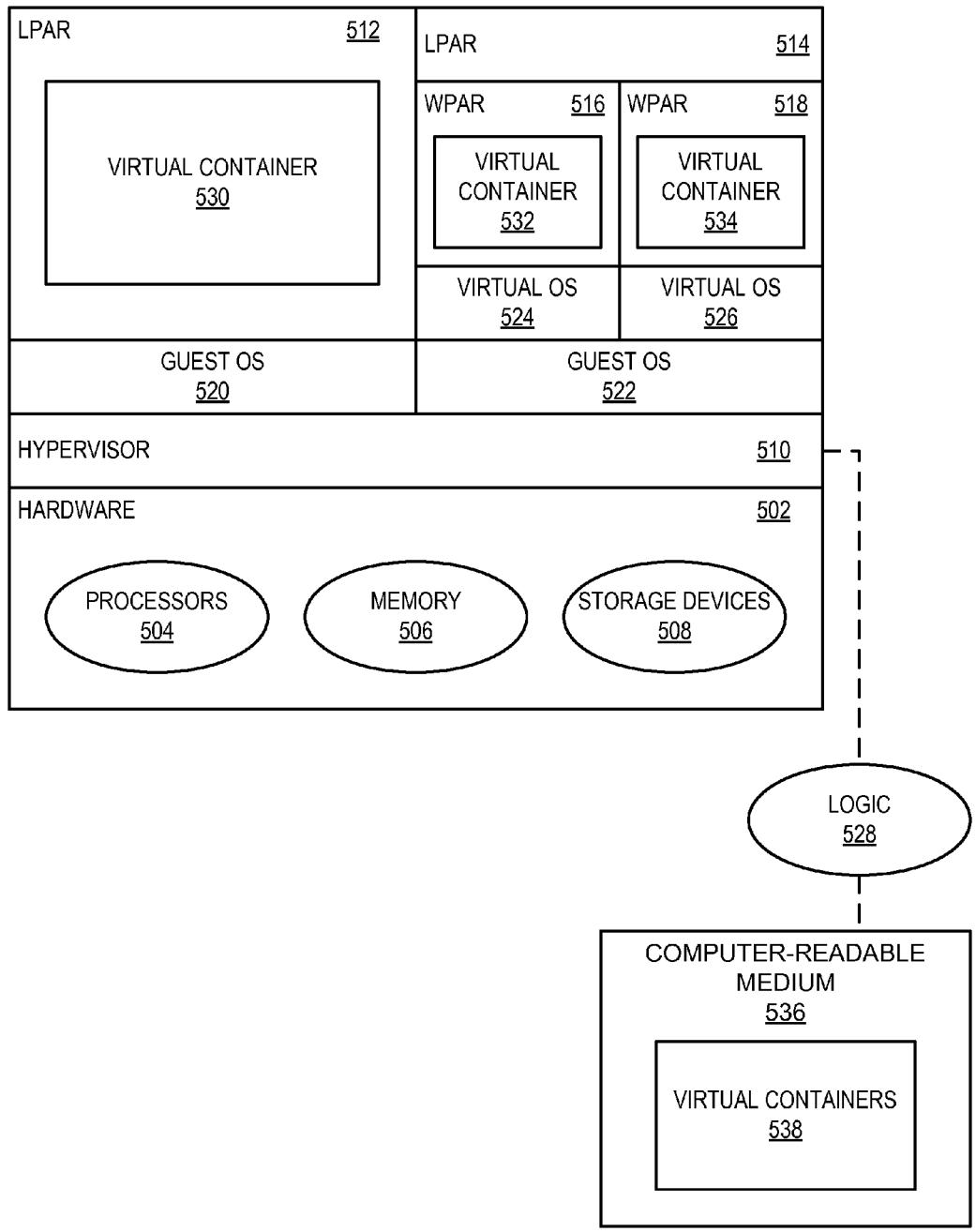
FIG. 5 is a diagram of a representative system, according to an embodiment of the present invention.

FIG. 5 shows a representative system 500, according to an embodiment of the invention. The system 500 may be implemented over one or more computing devices. The system 500 includes hardware 502, such as one or more processors 504, memory 506, storage devices 508, and/or other types of hardware. A hypervisor 510, as has been described, runs on the hardware 502. The hypervisor manages the creation, removal, and maintenance of partitions.

In the exemplary system 500, there are four partitions. Specifically, there are LPARs 512 and 514, and WPARs 516 and 518 running on the LPAR 514. The LPARs 512 and 514 have guest operating systems 520 and 522, respectively, running on them, whereas the WPARs 516 and 518 have virtual operating systems 524 and 526, respectively, running on them.

The system 500 includes a computer-readable data storage medium 536 that stores a number of virtual containers 538. Each virtual container 538 includes an application computer program and metadata representing operating system requirements for the application computer program. Each virtual container 538 is thus equivalent to a virtual appliance, minus an operating system.

The system 500 includes logic 528 that may be implemented by the hardware 502. For instance, the logic 528 may be one or more computer programs that are executed from and/or using the hardware 502. The logic 528 copies the virtual containers 538 from the computer-readable medium 536 to the LPARs 512 and 514, and to the WPARs 516 and 518. For instance, the LPAR 512 has the virtual container 530 running thereon, whereas the WPARs 516 and 518 of the LPAR 514 have the virtual containers 532 and 534, respectively, running thereon.

Specifically, for a given virtual container, the logic 528 copies the application computer program of the virtual container to a given partition selected from the partitions 512, 514, 516, and 518, where the operating system of the given partition, be it a guest operating system or a virtual operating system, satisfies the operating system requirements for the application computer program. The logic 528 further configures the application computer program for this operating system, to recreate dependencies between the application computer program and the operating system. In this way, it is said that the virtual container in question runs on the selected partition.

Embodiments of the invention thus provide for smaller virtual appliance images, as well as a way to distribute and update applications without affecting the operating system or any certifications installed on the operating system. Embodiments provide for a mechanism to deploy a virtual machine or a container or WPAR. On System X® server computing devices available from International Business Machines Corp., and which employ the LINUX® operating system, embodiments allow a user to deploy a container as native to the system, or within a virtual machine, such as a KVM or a Xen® virtual machine, available from Citrix Systems, Inc., of Ft. Lauderdale, Fla. Furthermore, on System P® server computer devices available from International Business Machines Corp., and which employ the LINUX® operating system, embodiments of the invention allow a user to deploy a container on an LPAR, as an LPAR itself. On System Z® server computing devices available from International Business Machines Corp., and which employ the LINUX® operating system, embodiments of the invention allow a user to deploy a container on an LPAR, or as a zOS application.

Embodiments of the invention thus avoid licensing issues when using the LINUX® operating system. Separate licensing arrangements, in other words, do not have to be made with providers of the LINUX® operating system to distribute and deploy a virtual appliance, since the virtual appliance does not include an image of an operating system. Rather, the operating system a user already has can be used in conjunction with a virtual appliance pursuant to embodiments of the invention.

The image containers of embodiments of the invention can include OVF metadata to specify the requirements for the virtual appliances, as well as application images, data and file system fragments, and so on. This information is thus used to create a container, which can be created on a native LINUX® operating system deployment, or within a LINUX® operating system environment running within a virtual machine. The container can be deployed as a KVM guest, or as a power LPAR itself. This decision can be made at time of deployment, where the OVF metadata of the container is parsed to determine how deployment is to occur. If the virtual appliance is intended to be deployed as an LPAR, the provided image can be revised with the binary and file system data provided within the OVF metadata. Alternatively, a user can instantiate the LPAR first, and the run the container within the LAPR.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   permitting a user, by a computing device, to select an application computer program other than an operating system or a virtual machine to include in a virtual container that will not include any operating system or virtual machine;
   permitting the user, by the computing device, to select operating system requirements for the application computer program;
   generating the virtual container, by the computing device, the virtual container including the application computer program and metadata representing the operating system requirements, and not including any operating system or virtual machine; and,
   storing the virtual container, by the computing device, on a computer-readable storage medium for delivery of the virtual container to an end user for copying to a target computing device of the end user,
   wherein the virtual container for the application computer program is a single virtual container representing the operating system requirements for multiple operating systems and versions thereof,
   wherein the application computer program within the virtual container has already been preinstalled on a workload partition (WPAR) of a logical partition (LPAR) and subsequently encapsulated such that the application computer program is divorced from an operating system of the WPAR of the LPAR on which the application program was preinstalled,
   wherein the application computer program is executable on a guest operating system after having been copied thereto without having to be formally installed,
   wherein the virtual container is such that at the target computing device:
   the end user selects a first partition of the target computing device, the first partition providing a virtual operating system for the application computer program;
   the end user selects a second partition of the target computing device, the second partition having the guest operating system;
   where the virtual operating system of the first partition satisfies the operating system requirements for the application computer program, the target computing device copies the application computer program within the first partition so that the application computer program runs on the virtual operating system;
   where the guest operating system of the second partition satisfies the operating system requirements for the application computer program, the target computing device copies the application computer program within the second partition so that the application computer program runs on the guest operating system of the partition, and wherein addition of the virtual operating system or the guest operating system to the virtual container renders the virtual container as the virtual appliance.

2. The method of claim 1, wherein the metadata comprises configuration information for running the application computer program on each version of each operating system specified by the operating system requirements for the application computer program.

3. The method of claim 1, wherein the virtual container is generated in a modified open virtualization format (OVF).

4. The method of claim 1, wherein the virtual container is stored as a single file on the computer-readable storage medium.

5. The method of claim 4, wherein the virtual container is stored as the single file on the computer-readable storage medium in .tar format.

6. The method of claim 1, wherein the virtual container is executable on a partition of the target computing device that provides a virtual operating system for the application of the virtual container.

7. The method of claim 1, wherein the virtual container is executable on a partition of the target computing device, the end user providing the guest operating system to run within the partition for the virtual container, such that addition of the guest operating system to the virtual container renders the virtual container as the virtual appliance.

8. A method comprising:
   receiving, by a computing device, a virtual container not including any operating system or any virtual machine;
   extracting, by the computing device, an application computer program other than an operating system or a virtual machine and metadata from the virtual container, the metadata representing operating system requirements for the application computer program;
   (a) permitting a user, by the computing device, to select a partition of a target computing device that provides a virtual operating system for the application of the virtual container; and,
   (b) where the virtual operating system of the partition of the target computing device satisfies the operating system requirements for the application computer program,
   copying, by the computing device, the application computer program within the partition of the target computing device so that the application computer program runs on the virtual operating system of the partition,
   wherein the virtual container for the application computer program is a single virtual container representing the operating system requirements for multiple operating systems and versions thereof,
   wherein the application computer program within the virtual container has already been preinstalled on a workload partition (WPAR) of a logical partition (LPAR) and subsequently encapsulated such that the application computer program is divorced from an operating system of the WPAR of the LPAR on which the application program was preinstalled,
   wherein the application computer program is executable on a guest operating system after having been copied thereto without having to be formally installed,
   wherein the partition is a first partition, and the method further comprises:
   (c) permitting the user, by the computing device, to select a second partition of the target computing device, the second partition having a guest operating system; and, (d) where the guest operating system of the second partition of the target computing device satisfies the operating system requirements for the application computer program, copying, by the computing device, the application computer program within the second partition of the target computing device so that the application computer program runs on the guest operating system of the second partition, and wherein addition of the guest operating system or the virtual operating system to the virtual container renders the virtual container as the virtual appliance.

9. The method of claim 8, further comprising:

requesting a user to select the first partition or the second partition of the target computing device for running the application computer program;

where the user selects the second partition, performing (d); and, where the user selects the first partition, performing (b).

10. The method of claim 8, wherein the operating system requirements for the application computer program specify identities of one or more operating systems on which the application computer program can run, and one or more versions of each operating system on which the application computer program can run.

11. The method of claim 10, wherein the metadata comprises configuration information for running the application computer program on each version of each operating system specified by the operating system requirements for the application computer program.

12. The method of claim 8, wherein the virtual container is generated in a modified open virtualization format (OVF).

13. The method of claim 8, wherein the virtual container is stored as a single file on a computer-readable storage medium.

14. The method of claim 13, wherein the virtual container is stored as the single file on the computer-readable storage medium in .tar format.

15. A system comprising:

a storage device to store a virtual container including an application computer program other than an operating system or a virtual machine and metadata representing operating system requirements for the application computer program, the virtual container not including any operating system or virtual machine;

hardware including one or more processors, memory, and one or more storage devices;

one or more logical partitions implemented by the hardware, each logical partition having a guest operating system running thereon;

one or more workload partitions implemented by the logical partitions, each workload partition having a virtual operating system running thereon; and, logic implemented by the hardware; to copy the application computer program to a given partition selected from the logical partitions and the workload partitions where the guest operating system or the virtual operating system of the given partition satisfies the operating system requirements for the application computer program, wherein where the given partition is one of the logical partitions, the application computer program runs on the guest operating system of the given partition, such that addition of the guest operating system to the virtual container renders the virtual container as the virtual appliance, wherein the application computer program within the virtual container has already been preinstalled on a workload partition (WPAR) of a logical partition (LPAR) and subsequently encapsulated such that the application computer program is divorced from an operating system of the WPAR of the LPAR on which the application program was preinstalled, wherein the application computer program is executable on the guest operating system after having been copied thereto without having to be formally installed, wherein a user selects a first partition from one of the workload partitions, the first partition providing a given virtual operating system for the application computer program, wherein the user selects a second partition from one of the logical partitions, the second partition having a given guest operating system for the application computer program, wherein where the given virtual operating system satisfies the operating system requirements for the application computer program, the logic copies the application computer program within the first partition so that the application computer program runs on the given virtual operating system, wherein where the given guest operating system satisfies the operating system requirements for the application computer program, the logic copies the application computer program within the second partition so that the application computer program runs on the given guest operating system, and wherein addition of the virtual operating system or the guest operating system to the virtual container renders the virtual container as the virtual appliance.

16. The system of claim 15, wherein the operating system requirements for the application computer program specify identities of one or more operating systems on which the application computer program can run, and one or more versions of each operating system on which the application computer program can run, and wherein the metadata comprises configuration information for running the application computer program on each version of each operating system specified by the operating system requirements for the application computer program.

17. The system of claim 15, wherein the virtual container is generated in a modified open virtualization format (OVF), and is stored as a single file on the computer-readable storage medium in .tar format.

18. A computer program product comprising a storage device storing one or more computer programs that when executed by a computing device cause a method to be performed, the method comprising:

permitting a user to select an application computer program other than an operating system or a virtual machine to include in a virtual container that will not include any operating system or virtual machine;

permitting the user to select operating system requirements for the application computer program;

generating the virtual container, the virtual container including the application computer program and metadata representing the operating system requirements, and not including any operating system or virtual machine; and, storing the virtual container on a computer-readable storage medium for delivery of the virtual container to an end user for copying to a target computing device of the end user, wherein the virtual container for the application computer program is a single virtual container representing the operating system requirements for multiple operating systems and versions thereof, wherein the application computer program within the virtual container has already been preinstalled on a workload partition (WPAR) of a logical partition (LPAR) and subsequently encapsulated such that the application computer program is divorced from an operating system of the WPAR of the LPAR on which the application program was preinstalled, wherein the application computer program is executable on a guest operating system after having been copied thereto without having to be formally installed, wherein the virtual container is such that at the target computing device:
  the end user selects a first partition of the target computing device, the first partition providing a virtual operating system for the application computer program;
  the end user selects a second partition of the target computing device, the second partition having the guest operating system;

where the virtual operating system of the first partition satisfies the operating system requirements for the application computer program, the target computing device copies the application computer program within the first partition so that the application computer program runs on the virtual operating system;

where the guest operating system of the second partition satisfies the operating system requirements for the application computer program, the target computing device copies the application computer program within the second partition so that the application computer program runs on the guest operating system of the partition, and wherein addition of the virtual operating system or the guest operating system to the virtual container renders the virtual container as the virtual appliance.

* * * * *